Patented Nov. 18, 1952

2,618,571

UNITED STATES PATENT OFFICE 2,618,571

PROCESS FOR THE PRODUCTION OF RED IRON OXIDE PIGMENTS

John Buttery Peel and Sydney Ernest Scrimshaw, Blackley, Manchester, England, assignors to Imperial Chemical Industries Limited, a corporation of Great Britain No Drawing. Application June 7, 1949, Serial No. 97,702. In Great Britain June 24, 1948

5 Claims. (Cl. 106—304)

This invention relates to the manufacture of colouring matters and more particularly it relates to the manufacture of bright red oxide colouring matters.

According to our invention therefore we provide a process for the manufacture of red iron oxide pigments which comprises treating with air an aqueous alkaline suspension of ferrous carbonate containing zinc carbonate and/or aluminium hydroxide at a temperature not lower than 60° C., the quantities of zinc carbonate and aluminium hydroxide being such that the suspension contains between about 0.1 and 10 parts of zinc and/or between about 0.1 and 4 parts of aluminium to each 100 parts of iron.

The suspension to be treated with air may be obtained for example by (1) adding a soluble zinc and/or aluminium salt to a soluble ferrous salt, for example the sulphate or chloride and adding an alkali metal carbonate. (The aluminium carbonate, if formed in this way, is probably hydrolysed immediately to the hydroxide), (2) precipitating the zinc carbonate and/or aluminium hydroxide, adding the suspension to a solution of ferrous salt and then adding an alkali metal carbonate or (3) by simply mixing ferrous carbonate suspension with a suspension of zinc carbonate and/or aluminium hydroxide.

The pigments may if desired be struck on an inert white base. Thus for example a small proportion of barium chloride may be added to a ferrous sulphate solution before precipitating the ferrous carbonate and in this way a colloidal precipitate of barium sulphate which forms a suitable inert white base may be obtained. Varying proportions of white base may be used but in order to maintain the high staining power of the pigment the weight of white base used should preferably not be higher than about 10% of the weight of the pigment.

The pigments obtained by the process of our invention are much brighter than those obtained in the absence of zinc and aluminium.

The invention is illustrated but not limited by the following examples in which the parts are by weight:

Example 1

34.4 parts of copperas ($FeSO_4.7H_2O$) and 1.4 parts of zinc sulphate ($ZnSO_4.7H_2O$) are dissolved in 72 parts of cold water. A cold solution of soda ash prepared by dissolving 16 parts of sodium carbonate in 50 parts of water, is then added until the solution is slightly alkaline. The pH of the suspension is then adjusted to approximately 8.6 by adding alkali or mineral acid. The suspension is then heated to 80° C. and oxidised by blowing air through the suspension for 18-20 hours at 80° C. until the ferrous iron content is less than 1%. The pigment is then filtered off, washed and dried at 80-100° C. A soft bright red pigment is obtained.

If in the above process there are used 2.8 parts of zinc sulphate in place of 1.4 parts of zinc sulphate and 17 parts instead of 16 parts of sodium carbonate, then a soft yellowish-red pigment is obtained.

Example 2

34.4 parts of copperas and 6.8 parts of aluminium sulphate ($Al_2(SO_4)_3.18H_2O$) are dissolved in 72 parts of cold water. A cold solution of soda ash prepared by dissolving 20 parts of sodium carbonate in 50 parts of water is then added until the solution is slightly alkaline. The pH is adjusted to approximately 8.6 and the suspension is air blown as described in Example 1. A bright red pigment is obtained.

Example 3

34.4 parts of copperas, 1.4 parts of zinc sulphate ($ZnSO_4.7H_2O$) and 2.4 parts of aluminium sulphate ($Al_2(SO_4)_3.18H_2O$) are dissolved in 72 parts of cold water. A cold solution of soda ash prepared by dissolving 18 parts of sodium carbonate in 50 parts of water is then added until the solution is slightly alkaline. The pH is adjusted to 8.6 and the suspension is air blown as described in Example 1.

In place of the 1.4 parts of zinc sulphate and 2.4 parts of aluminium sulphate there may be used 2.8 parts of zinc sulphate and 1.2 parts of aluminium sulphate.

Example 4

34.4 parts of copperas, 1.4 parts of zinc sulphate and 1.2 parts of aluminium sulphate are dissolved in 70 parts of cold water. 0.6 part of barium chloride ($BaCl_2.2H_2O$) is dissolved in 2 parts of cold water and added to the ferrous sulphate solution. A cold solution of soda ash prepared by dissolving 16 parts of sodium carbonate in 50 parts of water is then added until the solution is slightly alkaline. The pH is adjusted to 8.6 and the suspension is air blown as described in Example 1.

Example 5

1.28 parts of zinc sulphate and 1.1 parts of aluminium sulphate are dissolved in 50 parts of a cold solution of ferrous chloride containing 300 gms. per litre of ferrous chloride. A cold solution of soda ash prepared by dissolving 15.5 parts of sodium carbonate in 50 parts of water is then added until the solution is slightly alkaline. The pH is adjusted to about 8.6 and the suspension is air blown as described in Example 1.

We claim:

1. A process for the manufacture of red iron oxide pigments which comprises blowing with air an aqueous alkaline suspension of ferrous carbonate and at least one member of the group consisting of zinc carbonate and aluminum hydroxide at a temperature which at all times during the blowing treatment is not lower than 60° C., and thereafter separating the red precipitate thus formed from the reaction mixture, the quantity of zinc carbonate being such that the suspension contains between about 0.1 and 10 parts of zinc to each 100 parts of iron and the quantity of aluminum hydroxide being such that the suspension contains between about 0.1 and 4 parts of aluminum to each 100 parts of iron.

2. Process according to claim 1 wherein the iron oxide pigment is struck on an inert white base.

3. Process according to claim 2 wherein the weight of the inert white base is not higher than about 10% of the weight of the pigment.

4. A process as claimed in claim 1 wherein the suspension of ferrous carbonate contains both zinc carbonate and aluminum hydroxide.

5. A process as claimed in claim 1 wherein the aqueous alkaline suspension of ferrous carbonate is obtained by adding an alkali metal carbonate to a ferrous salt solution.

JOHN BUTTERY PEEL.
SYDNEY ERNEST SCRIMSHAW.

REFERENCES CITED

The following references are of record in the file of this patent:

UNITED STATES PATENTS

| Number | Name | Date |
|---|---|---|
| 2,090,476 | Fireman | Aug. 17, 1937 |
| 2,388,659 | Ryan et al. | Nov. 6, 1945 |

FOREIGN PATENTS

| Number | Country | Date |
|---|---|---|
| 1,882 | Great Britain | 1892 |
| 239,709 | Great Britain | Sept. 17, 1925 |